Aug. 6, 1968  R. L. PATTERSON  3,396,058

ONE-PIECE "FOLD-OVER" BATTERY TERMINAL

Filed Nov. 15, 1965

INVENTOR.
RICHARD L. PATTERSON
BY
ATTORNEY

United States Patent Office 3,396,058
Patented Aug. 6, 1968

3,396,058
ONE-PIECE "FOLD-OVER" BATTERY TERMINAL
Richard L. Patterson, Bennington, Vt., assignor to Union
Carbide Corporation, a corporation of New York
Filed Nov. 15, 1965, Ser. No. 507,874
1 Claim. (Cl. 136—134)

ABSTRACT OF THE DISCLOSURE

A unitary battery terminal contact member with an outer contact portion and an inner contact portion joined together by an intermediate section which is folded upon itself to resiliently position said contact portions in back-to-back relationship with oppositely directed contact surfaces.

This invention relates to a battery terminal, and more particularly to a novel one piece battery end terminal provided with a "built in" spring for maintaining electrical contact throughout a "stack" of cells. The invention also contemplates a terminal structure for galvanic cells which is simple in construction, reliable in operation and which may be readily utilized in the manufacture of batteries on a practical and commercial basis at a very low cost.

Dry batteries commonly consist of a plurality of individual cells assembled in a suitable compact order and electrically connected to furnish the desired electrical characteristics at the battery terminal. It is the practice to interconnect the individual cells together in a particular fashion, to connect the positive terminal to the positive electrode, and to connect the negative terminal to the negative electrode of a battery, the latter of which are connected by means of conductive connectors which in most instances are secured to the electrodes and terminals by soldering.

In flat dry cell constructions such as the button or layer-built type, intercell soldered connections can be eliminated by holding the cells under compression, although other methods of intercell connections, such as welding the cells together or applying a conductive cement or paste between the cells, etc. can also be employed. However, even though intercell connections can be eliminated there is still the need for readily connecting the top positive electrode and lower negative electrode to their respective terminals in a simple and economical fashion. Presently this is generally done with a separate resilient element such as a conductive contact spring, wire lead or even a conductive strip.

Accordingly, it is therefore an important object of the invention to provide a battery terminal for a dry cell or battery which is so constituted and constructed that it also functions both as a retainer in order to retain the cell or cells inside the cell container or jacket and as a spring like member to maintain intercell electrical contact.

Another object of the invention is to provide a simple and inexpensive terminal and one which can be economically manufactured from a coiled strip stock by means of a punch press, eyelet machine or the like.

It is yet another object of the invention to provide a novel and improved battery terminal for cells which eliminates the need for a separate conductive contact spring and which eliminates the difficulties experienced with prior art terminal constructions and arrangements.

Other objects, features and advantages of the present invention will be apparent from the following detailed description of a preferred embodiment thereof, taken in conjunction with the accompanying drawing, in which.

Figure 1:
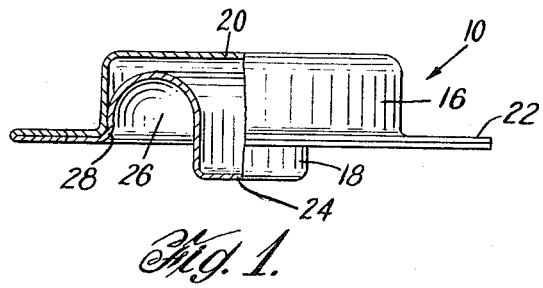
FIGURE 1 is a sectional elevational view of the battery terminal embodying the principles of the invention.
Figure 1A:
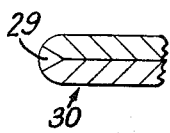
FIGURE 1a is an enlarged view of a portion of FIGURE 1.
Figure 2:
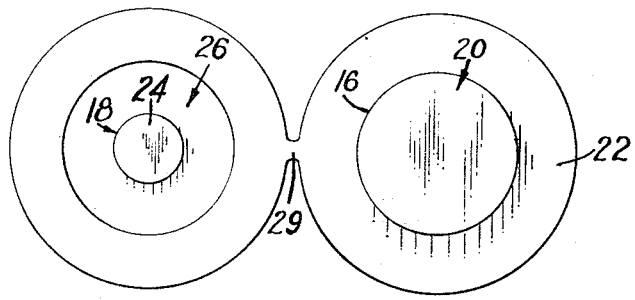
FIGURE 2 is a plan view of the terminal member in its developed form prior to its final assembly or "fold-over operation.
Figure 3:
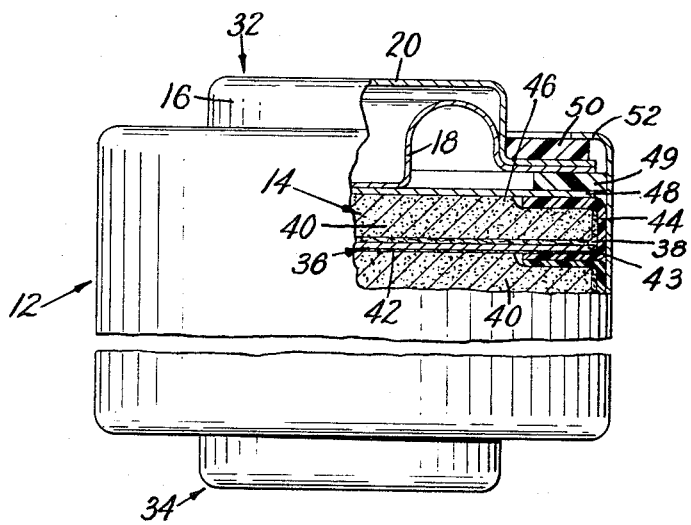
" and FIGURE 3 is a sectional elevational view of a battery employing the battery terminals of the invention.

In FIGURES 1–3 and particularly FIGURE 1, there is shown an end cover and battery terminal 10 embodying the features of the present invention. The battery terminal 10 is adapted to be applied to a cell assembly or battery 12 of "jacketed" dry cells 14 for retaining the cells in assembled axial relation and for carrying electrical current from inside of the battery 12 to the outer center terminal contact 16. The battery terminal 10 may be made of any suitable metal such as steel and comprises a conductive integral, one-piece unit folded back upon itself so as to provide inner and outer contact portions, respectively identified by the numerals 18 and 20.

Outer contact portion 20 comprises a suitable flange portion 22 and the raised center terminal contact 16. Of course, other configurations of the center terminal contact 16, such as a socket, stud or the like may also be employed in the practice of the invention. The inner contact portion 18 comprises an inner center contact 24 and a contoured portion 26 for providing any necessary spring like action desired to maintain the stack of cells in assembled relationship and in electrical contact with each other. The countoured portion 26 is preferably of a recessed semi-circular shape but it may also be of any other suitable configuration or surface of revolution, such as a "barb" which would also provide the necessary spring action. Obviously, the maximum diameter of the semicircular recess 28 must be less than the diameter of the raised center terminal contact 16 so that the battery terminal 10 when folded upon itself about section 29 produces a back-to-back flanged periphery 30.

FIGURE 2 illustrates the battery terminal 10 in its developed state prior to being folded like a clam shell to provide "solid like" bossed contacts for both inner and outer portions of the terminal when assembled into a battery such as shown in FIGURE 3. As shown in FIGURE 3, two battery terminals 32 and 34 are employed at opposite ends of the battery 12. For the purpose of illustration, the battery 12 consists of a plurality of suitable Leclanché type cells 14 (two of which are shown) stacked in line and in series, although a single cell version is also within the scope of the invention. In such applications the terminal members serve to maintain electrical contact between the cell and the inner contacts of the terminals. Of course, any desired battery configuration of cells whether in series, parallel or series-parallel stacks can also embody the battery terminal of the invention without departing from the spirit and scope of the invention. In addition, the battery terminal of the invention can generally be utilized in any other type of battery or cell system, such as the alkaline-manganese dioxide-zinc battery system, other alkaline systems, nickel-cadmium system, mercury batteries, etc.

The cells 14 comprise the same materials used in a conventional round (carbon-zinc $MnO_2$ system) Leclanché dry cell and are flat instead of cylindrical in shape. Each cell 14 comprises a duplex electrode 36 of a cathode-collector and anode, a separator 38, and a depolarizer mix cake 40, the latter of which comprises the manganese dioxide, carbon powder and electrolyte. The duplex electrode 36 is formed of a thin carbon current collector 42 and a zinc electrode 43. All of the components of the cell 14 are enveloped by suitable jacketing means such as a thin elastic band 44 of a thermoplastic material such as vinylite, shrinkable polyvinylchloride and the like. The projection 46 on each mix cake 40 is for contact with the carbon current collector of the next cell or battery above.

As shown in FIGURE 3, the ends (only one end shown) of the stack of cells are provided with suitable end current collectors 48 which in this instance because of the electrical arrangement of the battery 12 make electrical contact respectively with the upper mix cake 40 the lower carbon current collector 42 or duplex electrode. Of course, the end current collectors 38 also contact the battery terminals associated therewith, top terminal 32 being the positive and bottom terminal 34 the negative. A suitable non-conductive spacer 49 is disposed between the end current collector 48 and the flange portion 30 of the terminals. If necessary as in the battery of FIGURE 3, suitable insulating means, such as washer 50 is provided between the terminal member 10 and the battery container or jacket 52. The peripheral flange portion 30 of the end cover terminals of the invention are held tightly to the cell stack or assembly by the curled or crimped outer marginal portions of said jacket 52. If desired, only one battery terminal of the invention may be embodied in battery applications where it may be necessary to employ another type of end closure terminal.

While the invention is described in terms of a particular embodiment, it will be apparent to those skilled in the art that other modifications will thereby be suggested without departing from its spirit and scope. For example, one end terminal can be mounted in a direction so that the spring-loaded contact is externally exposed for use in applications other than maintaining intercell electrical contact, etc.

What is claimed is:
1. A terminal contact member for a battery having at least one cell comprising an outer terminal contact portion and a resilient inner contact portion each having an outer circumferential flange, said portions being integrally formed as a single unitary member with an intermediate section of said unitary member folded upon itself to join said outer and inner contact portions with a hinged interconnection in a back-to-back position so as to provide oppositely directed contact surfaces within said outer circumferential flange, said outer terminal contact portion comprising a raised section and said resilient inner contact portion comprising a surface of revolution for generating a resilient spring force, said surface of revolution extending within said raised section outer terminal contact portion.

References Cited
UNITED STATES PATENTS

| | | | |
|---|---|---|---|
| 2,445,005 | 7/1948 | Schmelzer | 136—133 |
| 2,495,247 | 1/1950 | Friedman | 136—135 |
| 2,816,151 | 1/1957 | Ruben | 136—111 X |

WINSTON A. DOUGLAS, *Primary Examiner.*

D. L. WALTON, *Assistant Examiner.*